Aug. 4, 1964  R. G. STACY  3,143,191
DISK BRAKES FOR RAILWAY CARS
Filed May 12, 1961
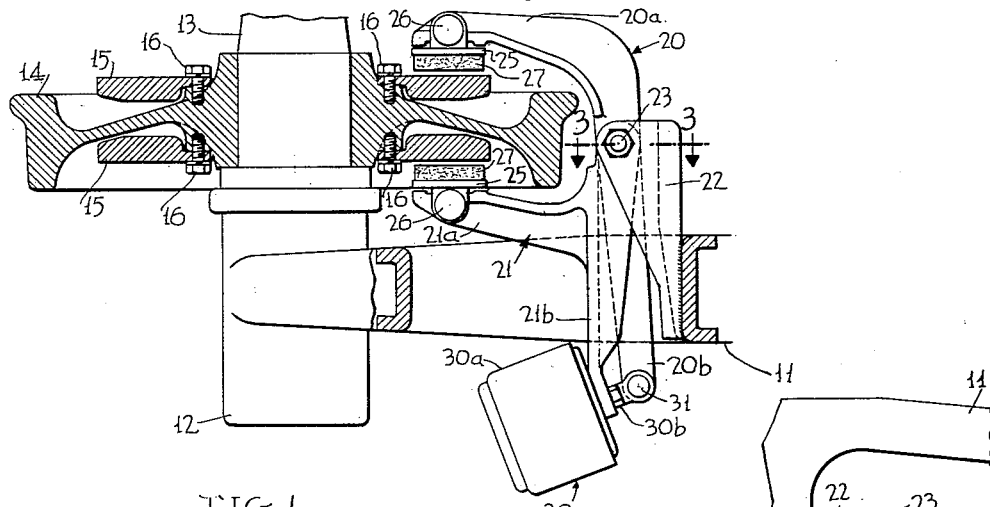
FIG. 1
FIG. 3
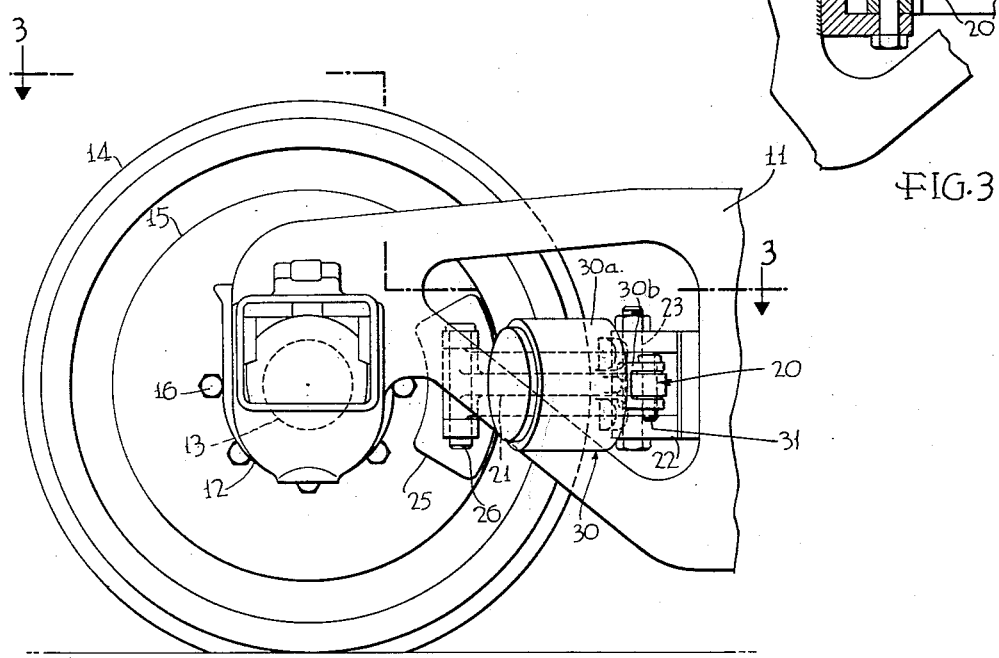
FIG. 2
INVENTOR.
Robert G. Stacy
BY
Wm. R. Glisson United States Patent Office 3,143,191
Patented Aug. 4, 1964

3,143,191
DISK BRAKES FOR RAILWAY CARS
Robert G. Stacy, Jenkintown, Pa., assignor to The Budd Company, Philadelphia, Pa., a corporation of Pennsylvania
Filed May 12, 1961, Ser. No. 109,668
1 Claim. (Cl. 188—59)

This invention relates to disk brakes for railway cars and has for an object the provision of improvements in this art.

One of the particular objects is to provide a very simple brake assembly in which the entire brake operating unit is mounted on a single pivot pin.

Another object is to provide a sideframe mounted brake assembly in which the operating arms extend through an opening in the sideframe, the brakes being located on one side of the sideframe and the actuating motor being located on the other side.

Another object is to provide brake operating mechanism in which both brake operating levers are bent at an angle intermediate their ends and extend transversely of the truck along their outer ends which carry the operating motor.

The above and other objects and advantages of the invention will be apparent from the following description of an exemplary embodiment, reference being made to the accompanying drawings, wherein:

FIG. 1 is a top plan view and section of one corner of a truck assembly embodying a brake assembly made according to the present invention;

FIG. 2 is an outside elevation; and

FIG. 3 is a vertical longitudinal section on the line 3—3 of FIG. 1.

The brake assembly is shown installed on a truck of known type having a frame which includes cross members and side frames 11, a portion of one of which is shown. The truck selected for illustration herein is a Buckeye A–3 shown on pages 1126; 1127 of Car Builders' Cyclopedia for 1946. The truck includes bearings and supports 12 for the axles 13 of wheel axle units which also include wheels 14 and brake disks 15, the brake disks here being secured to opposite sides of the wheel web as by cap bolts 16. A separate brake disk secured to the axle apart from the wheel in known manner could be used.

The brake assembly includes brake tong levers 20, 21, each of bell crank or L-shape, pivoted together and mounted on a support 22 of the truck frame by a single support and pivot pin 23.

The longitudinally extending support arms 20a and 21a of the tong levers carry brake shoes 25 pivoted thereto by pins 26 and the shoes carry brake lining blocks 27 for acting against the faces of the brake disks 15.

The operating arms 20b, 21b carry and are operated by a power motor 30 which comprises a cylinder 30a mounted on one lever, as the arm 21b of lever 21, and an operating rod 30b connected to the other lever, as to the arm 20b of lever 20, by a pivot pin 31.

In the illustrated arrangement the wheel and brake disk are inside the side frame and the power motor is located outside. The whole assembly can be removed by removing the pivot pin 23, or, at most, this pin and the pin 31 at the power motor, all accessible from the outside.

If the brake disk is located on the outside the power motor will be located on the inside, the arms 20b, 21b passing through the frame opening in the opposite direction, and here again the whole assembly can be removed by removing one pin or at most two pins.

Hand brake action can be provided by a simple toggle or cam connection between arms 20b and 21b together with an operating link or cable but it is not believed necessary to show this, it being thought sufficient to indicate that the assembly is readily adapted to have such a hand operating connection applied to it.

It is seen that the invention provides a very simple, convenient and easily installed brake assembly which can easily be inspected and serviced.

While one embodiment has been shown for purposes of illustration it is to be understood that there may be various embodiments and modifications within the general scope of the invention.

What is claimed is:
In a railway car, the combination comprising:
 (a) a truck having a longitudinally extending sideframe;
 (b) a wheel-axle unit rotatably mounted in bearings in said sideframe whereby each wheel is to one side of said sideframe;
 (c) a brake disk mounted on said wheel-axle unit adjacent to one of said wheels;
 (d) a bifurcated support bracket connected to said sideframe and extending transversely from said sideframe, said support bracket providing a pivot support longitudinally opposite said brake disk;
 (e) first and second bell crank levers, each of said levers comprising:
  (1) a longitudinally extending support arm,
  (2) and a transversely extending operating arm,
  (3) said support arm and said operating arm being pivoted on said pivot support;
 (f) said operating arms extending through said side frame from one side to the other;
 (g) brake shoes pivotally mounted on the ends of said support arms opposite the sides of said brake disk;
 (h) a fluid actuated power cylinder mounted on the end of one of said operating arms and having an operating rod pivotally connected to the end of the other of said operating arms for actuating said bell crank levers, said power cylinder being longitudinal and projecting from said operating arm on the longitudinal side thereof adjacent to said support arms, to provide a compact assembly with said brake shoes and said support arms located on one side of said sideframe and the ends of said operating arms and said power cylinder located on the other side of said sideframe;
 (i) and a pivot pin pivotally connecting said bell crank levers to said pivot support and supporting said levers, said brake shoes and said power cylinder as an assembly.

References Cited in the file of this patent
UNITED STATES PATENTS

| | | |
|---|---|---|
| 1,711,602 | Kindler | May 7, 1929 |
| 2,284,484 | Eksergian | May 26, 1942 |
| 2,464,680 | Gaenssle | Mar. 15, 1949 |
| 2,581,746 | Baselt | Jan. 8, 1952 |
| 2,885,034 | Holin | May 5, 1959 |

FOREIGN PATENTS

| 373,580 | Great Britain | 1932 |
|---|---|---|